Nov. 1, 1927.

G. O. BAKER

WATER PURIFIER

Filed Feb. 20, 1926

1,647,495

WITNESS:

INVENTOR

George Otis Baker

BY

Busser and Harding

ATTORNEYS.

Patented Nov. 1, 1927.

1,647,495

UNITED STATES PATENT OFFICE.

GEORGE OTIS BAKER, OF NEW YORK, N. Y., ASSIGNOR TO FEED-WATER DE-SCALING CORPORATION, OF NEW YORK, N. Y., A CORPORATION OF NEW YORK.

WATER PURIFIER.

Application filed February 20, 1926. Serial No. 89,536.

My invention relates to water purifiers, particularly to those used with steam boilers and the like, wherein there is provided a casing through which the water to be purified is adapted to flow and wherein it is subjected to the purifying action of particles detached from abrasive balls. These balls are caused to move in contact with drums or the like and to be thereby abraded, the materials of which the balls, and preferably also of the drums, are composed being such as to correct the impurities of the water. Such a water purifier is disclosed in the McCray and Hatch Patent No. 1,099,459, dated June 9, 1914.

It was also known, at an earlier date, to force the water to be purified through a race-way containing balls carrying materials adapted to correct the impurities of the water, the balls being forcibly propelled by the water, as disclosed in the Simmons Patent No. 867,430, dated October 1, 1907.

In neither patented water purifier, however, is every part of the water brought into direct and intimate contact with all the balls of a race-way or with any substantial proportion of them. In the patent of earlier date, the balls are spaced apart in the race-way at distances relatively great proportionately to their diameters and only the fore and aft parts of the column of water in the space between any two balls actually contact with the balls. In the patent of later date the water is merely introduced into a rotating cylinder in which the balls are contained and roll, and flows down past the balls, but every part of the water is not brought into direct and intimate contact with an entire series of balls.

The principal objects of the present invention are: to provide a water purifier of the character described but the construction of which is so substantially modified as to insure the circulation of water to be purified through one or more ball race-ways in such manner as to effect direct and intimate contact of the water with most or all of the series of balls contained in a race-way, thereby effecting the distribution of abraded particles with substantial uniformity throughout the water flowing through the feed pipe; also to provide improved means for carrying the race-way or race-ways and for directing the water into the same and conveying the water away therefrom.

My invention comprises a construction wherein the above objects are attained and which also embodies other structural features promotive of efficiency.

A preferred embodiment of the invention is shown in the accompanying drawing, wherein—

Figure 1:
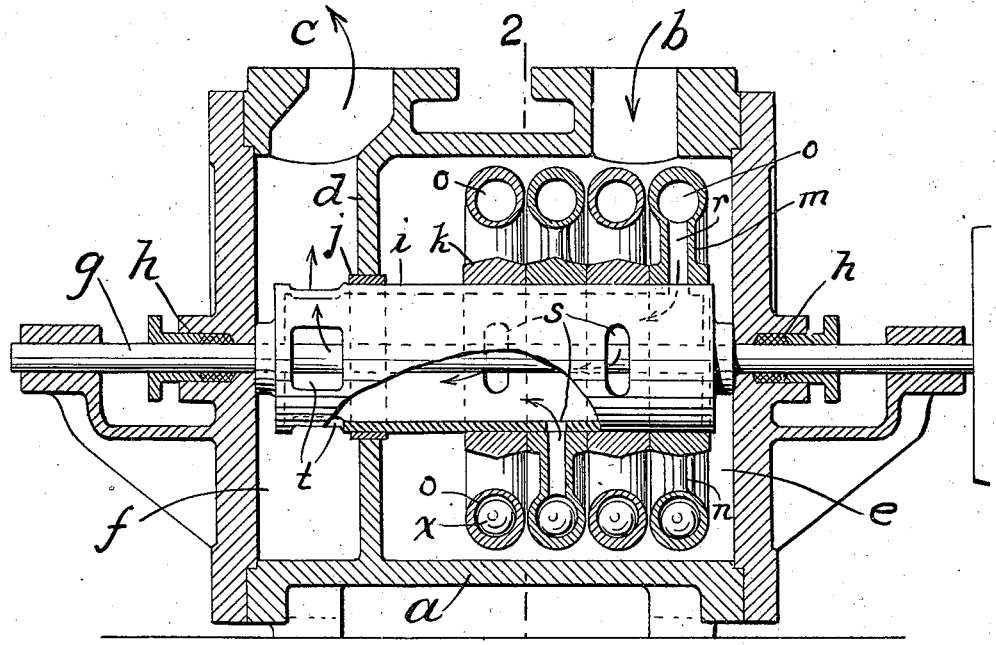
Fig. 1 is a longitudinal elevation principally in central section.
Figure 2:
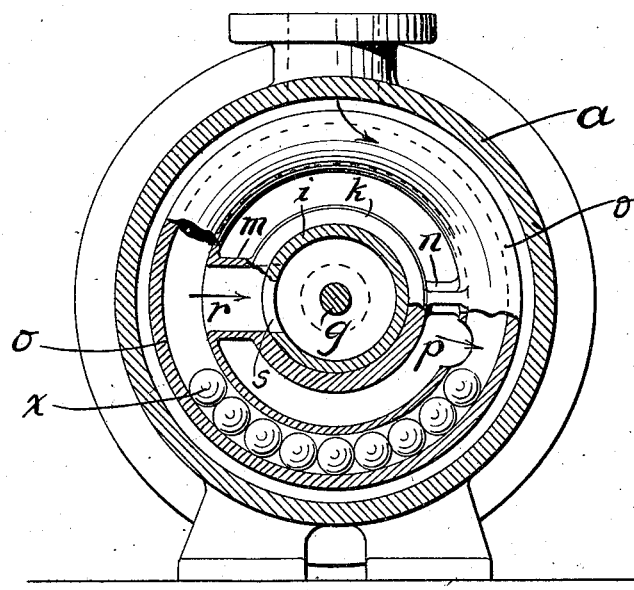
Fig. 2 is a cross section on line 2—2 of Fig. 1.

The casing $a$, which may be interposed in the feed pipe of a steam boiler, is provided with an inlet $b$ and an outlet $c$. A partition $d$ divides the casing into a relatively large inlet chamber $e$ and a relatively small outlet chamber $f$. Extending through both chambers of the casing is a shaft $g$ that is adapted to be rotated in suitable stuffing boxes $h$ in the outer wall of the casing and is driven by any suitable means.

A cylinder $i$, whose end hubs are keyed to shaft $g$, extends into both chambers $e$ and $f$ and substantially throughout the length of the casing, the body of the hub turning in a water tight ring $j$ in partition $d$.

Within chamber $e$ and surrounding cylinder $i$, is a circular ball container, the same comprising a hub $k$ secured to the cylinder, oppositely positioned webs or necks $m$ and $n$ projecting from the hub, and an annular ball race-way $o$ carried by such webs or necks. Preferably, a series of such ball-containers are provided, four being shown in the drawings.

Each ball race-way $o$ is provided with a water inlet $p$ communicating with the interior of chamber $e$. The neck $m$ of each ball container is provided with a water outlet channel $r$ that also extends through hub $k$ and communicates with the ball race-way $o$ and an orifice $s$ in cylinder $i$. Water outlet $p$ and water outlet $r$ are preferably located opposite, or nearly opposite, one another. The water inlets of adjacent ball containers are preferably in staggered relationship, as are the water outlets of adjacent ball-containers.

In chamber $f$, cylinder $i$ is orificed at $t$ to allow for outflow of water.

Within each ball race-way $o$ is a series of balls $x$. The ball race-way $o$ may be initially of a cross-section but little exceeding the diameter of the ball, and the frictional wearing face of the race-way should be curved, in cross section, on a radius nearly or quite corresponding to the radius of a ball. There is thus provided, when the purifier is first installed, a substantial area of frictional contact between the balls and the wall of the race-way, thus insuring an adequate abrasive action between them. As the balls wear away, so does the wall of the race-way and a channel is formed in the latter, the contour of which continuously adapts itself to the changing contour of the spherical face of the ball arising from its continuous shrinkage in diameter.

The balls and the walls of the race-way may be of any suitable compositions. Thus the race-way may be composed of graphitic cast iron with or without other metals mixed therewith. The balls may be composed of an alloy of graphitic cast iron with other metals; or they may be composed of pulverized graphite and one or more other metals such as iron, aluminum and zinc, the materials all being bound together by a binder such as sulphur. Both the balls and the race-way may be of the same material, in which case graphitic cast iron would be a preferable dominant constituent. Suitable abradable materials for water-purifying purposes are known in the art, and the present invention contemplates the use of race-ways and balls of any compositions that may be found efficient.

In operation the boiler feed water to be purified enters the chamber $e$ through the inlet $b$ and flows from the chamber $e$ through the inlet $p$ of one of the ball race-ways. Thence the water is compelled to make approximately a half circuit of the race-way $o$, and is brought into direct contact with the entire series of balls before it can escape through the outlets $r$ and $s$ into the interior of the cylinder $i$. As the water flows through the ball race-ways, the ball containers are continuously rotating and the balls move along the walls of the race-ways and particles are abraded both from the balls and the walls of the race-ways. The particles thus freed have a purifying action on the water.

The purified water that enters the interior of the cylinder $i$ escapes therefrom through the orifices $t$ into chamber $f$ and thence through outlet $c$.

Having now described my invention, what I claim and desire to protect by Letters Patent is:

1. A water purifier comprising a casing provided with a water inlet and a water outlet, a rotatable circular enclosed ball race-way within the casing, and a series of abradable balls rollable within the race-way, the race-way being provided with a water-admission opening communicating with said inlet and a water-discharge opening communicating with said outlet, said openings being so spaced apart as to compel a flow of water in a circumferential direction for a substantial distance through that part of the race-way in which the abradable balls roll.

2. A water purifier comprising a casing provided with a water inlet and a water outlet, a series of circular enclosed ball race-ways arranged side by side within the casing and rotatable together about a common axis, and a series of abradable balls rollable within each race-way, the water admission openings of adjacent race-ways being located on different radii of the common axis of rotation and the water discharge openings of adjacent race-ways also being located on different radii of the common axis of rotation.

3. A water purifier comprising a rotatable cylinder provided with a water outlet, a ball race-way surrounding the cylinder and rotatable therewith and adapted to contain a series of abradable balls, the race-way having a water admission opening, the race-way also having a water discharge opening communicating with the interior of the cylinder.

4. A water purifier comprising a casing divided into a water inlet chamber and a water outlet chamber, a rotatable cylinder extending into both chambers and provided with a water outlet communicating with the water outlet chamber, a ball race-way adapted to contain a series of abradable balls and surrounding the cylinder and rotating therewith and having a water admission opening communicating with the water inlet chamber and a water discharge opening communicating with the interior of the cylinder.

5. A water purifier comprising a rotatable cylinder provided with a water outlet and a water inlet opening, a ball container surrounding and secured to the cylinder, and comprising a hub, an enclosed ball race-way and necks connecting the hub and the race-way, the race-way having a water admission opening, one of said necks having a channel formed therein affording an outlet for water from the race-way to the water inlet opening in the cylinder.

In testimony of which invention, I have hereunto set my hand at Chester, Pa., on this 2nd day of February, 1926.

GEORGE OTIS BAKER.